(12) United States Patent
Bodki et al.

(10) Patent No.: US 11,814,160 B2
(45) Date of Patent: Nov. 14, 2023

(54) LANDING GEAR PERCOLATION

(71) Applicant: GOODRICH CORPORATION, Charlotte, NC (US)

(72) Inventors: Basavaraj Bodki, Bangalore (IN); Hemanth Nagaraja, Hassan (IN); Steve Healey, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 223 days.

(21) Appl. No.: 17/134,427

(22) Filed: Dec. 27, 2020

(65) Prior Publication Data
US 2022/0017212 A1    Jan. 20, 2022

(30) Foreign Application Priority Data
Jul. 16, 2020  (IN) .............................. 202041030431

(51) Int. Cl.
| | |
|---|---|
| *B64C 25/58* | (2006.01) |
| *B64C 25/60* | (2006.01) |
| *F16F 9/19* | (2006.01) |
| *F16F 9/36* | (2006.01) |
| *F16F 9/32* | (2006.01) |

(52) U.S. Cl.
CPC ............. *B64C 25/60* (2013.01); *F16F 9/19* (2013.01); *F16F 9/365* (2013.01); *F16F 9/3292* (2013.01); *F16F 2222/12* (2013.01)

(58) Field of Classification Search
CPC .. B64C 25/10; B64C 25/58; F16F 9/19; F16F 9/365; F16F 9/3292
See application file for complete search history.

(56) References Cited

U.S. PATENT DOCUMENTS

| | | | |
|---|---|---|---|
| 3,147,826 A | 9/1964 | Mchenry | |
| 3,888,436 A * | 6/1975 | Sealey | B64C 25/60 188/304 |
| 4,821,983 A | 4/1989 | Aubry et al. | |
| 4,907,760 A * | 3/1990 | Sealey | B64C 25/60 244/102 R |
| 4,958,706 A * | 9/1990 | Richardson | F16F 9/512 188/319.1 |
| 5,004,215 A | 4/1991 | Aubry et al. | |
| 5,305,860 A * | 4/1994 | Rotharmel | F16F 9/467 188/266.2 |
| 6,360,857 B1 * | 3/2002 | Fox | F16F 9/3485 188/319.1 |
| 9,186,950 B2 * | 11/2015 | Wootten | B60G 17/0416 |

(Continued)

FOREIGN PATENT DOCUMENTS

| | | |
|---|---|---|
| EP | 2860102 | 4/2015 |
| EP | 3848612 | 7/2021 |
| GB | 749695 | 5/1956 |

OTHER PUBLICATIONS

European Patent Office, European Search Report dated Dec. 3, 2021 in Application No. 21186116.6.

*Primary Examiner* — Vishal R Sahni
(74) *Attorney, Agent, or Firm* — SNELL & WILMER L.L.P.

(57) ABSTRACT

A shock strut is disclosed. The shock strut may include a shock strut cylinder, a shock strut piston that is slidably disposed within the shock strut cylinder, a metering pin, and a percolation seal configured to restrict a flow of liquid between the shock strut cylinder and the shock strut piston.

19 Claims, 5 Drawing Sheets

(56) References Cited

U.S. PATENT DOCUMENTS

| | | | |
|---|---|---|---|
| 10,520,055 B2 | 12/2019 | Lizell | |
| 2008/0277218 A1* | 11/2008 | Fox | F16F 9/5126 |
| | | | 188/314 |
| 2013/0327211 A1* | 12/2013 | Booth | F15B 15/265 |
| | | | 92/172 |
| 2018/0244373 A1* | 8/2018 | Mellor | B64C 25/20 |
| 2019/0144105 A1 | 5/2019 | Sharpe | |
| 2019/0203796 A1* | 7/2019 | Luce | F16F 9/342 |
| 2019/0309817 A1* | 10/2019 | Juracek | F16F 9/3485 |
| 2019/0329623 A1* | 10/2019 | Van De Plas | B60G 17/08 |
| 2021/0025470 A1* | 1/2021 | Reinmuth | F16F 9/3292 |

* cited by examiner

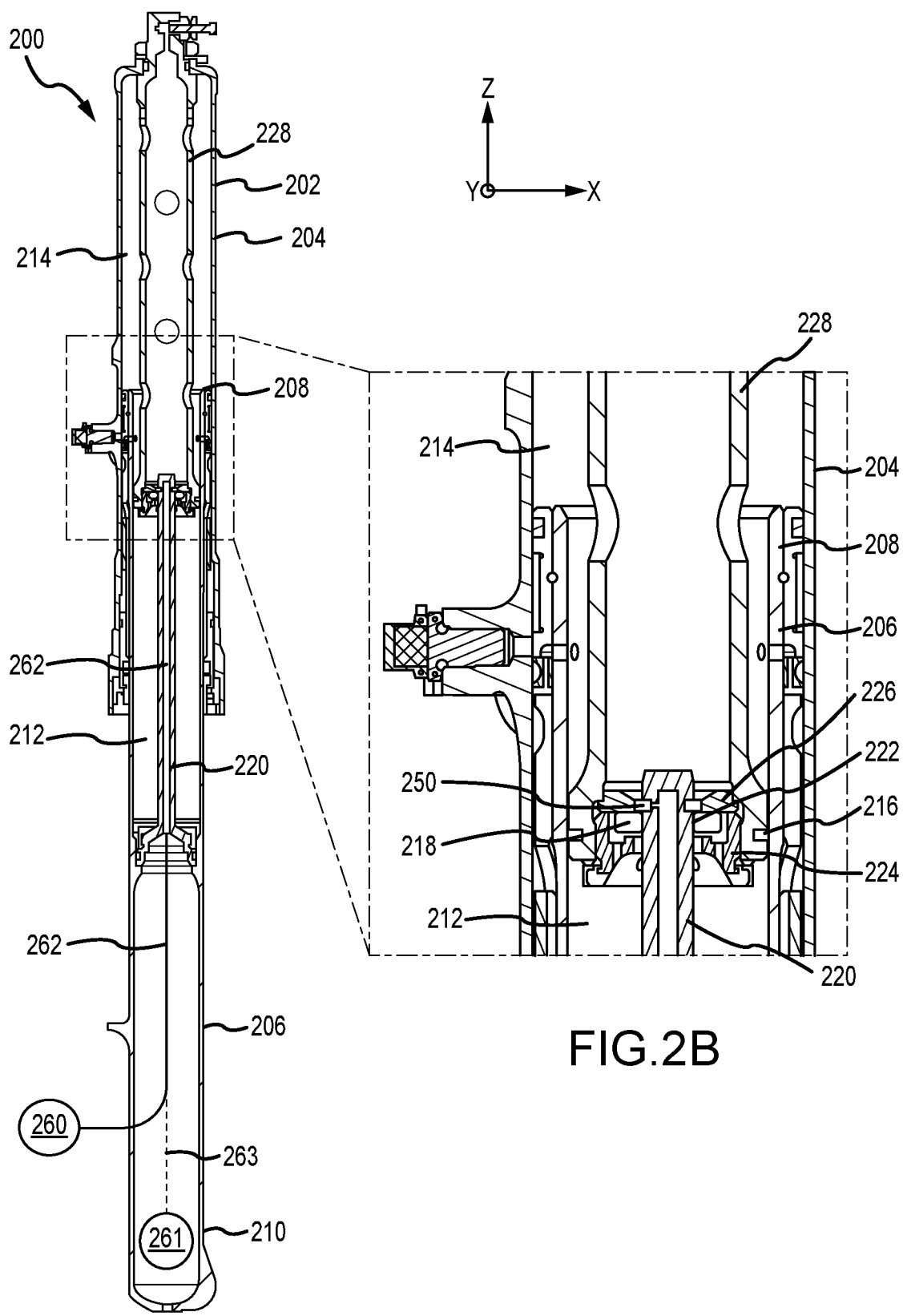

LANDING GEAR PERCOLATION

CROSS-REFERENCE TO RELATED APPLICATIONS

This application claims priority to, and the benefit of, Indian Patent Application No. 202041030431, filed Jul. 16, 2020 and titled "LANDING GEAR PERCOLATION," which is incorporated by reference herein in its entirety for all purposes.

FIELD

The present disclosure relates generally to aircraft landing systems and, more particularly, to systems and methods configured to reduce percolation within aircraft landing gear systems.

BACKGROUND

Commercial and military aircraft typically include one or more landing gear assemblies that are configured for retraction into and extraction from a landing gear bay via one or more actuators. Such landing gear assemblies, for example, may be retracted into and stowed within the landing gear bay during flight and extended from the landing gear bay and deployed during takeoff, taxi and landing events. A landing gear assembly typically includes a shock strut having an upper end pivotally mounted to a frame of the aircraft for pivotal displacement between a vertical, downwardly extending, landing and ground support position, and a horizontal or above horizontal retracted position nested within a landing gear bay or other location within the wing or fuselage of the aircraft.

Shock struts with mixed air/oil chambers may typically have a dynamic liquid damping chamber (e.g., a lower chamber) separated from a mixed gas and oil chamber (e.g., an upper chamber) by a metering orifice. Gas is known to leak into the lower chamber and oil into the upper chamber when the shock strut is in the retracted position; and, more particularly, when the shock strut is retracted to a position above a horizontal configuration where a portion of the lower chamber is positioned above a portion of the upper chamber (e.g., the shock strut is retracted to an angle greater than ninety degrees with respect to a vertical reference). When the shock strut is retracted to an angle greater than ninety degrees and maintained in that position for a period of time, the gas and oil may tend to switch chambers due to the force of gravity. As the shock strut is moved to an extended position, such as, for example, in preparation for a landing event, gas may begin to move back into the upper chamber and oil into the lower chamber. However, if there is insufficient flow area to allow the gas and oil to switch places (e.g., to allow the oil to flow back into the lower chamber and the gas to flow back into the upper chamber), the landing gear may not be ready to land within a prescribed time period following extension. This is because the shock strut is typically configured to work most efficiently with the lower chamber devoid of any gas. Thus, if there is still gas in the lower chamber during the landing event, the shock strut may not perform at the highest efficiency. The adverse effect of such percolation may be exacerbated, moreover, by the cold temperatures typically encountered when operating at cruising altitudes.

SUMMARY

A shock strut is disclosed. In various embodiments, the shock strut includes a shock strut cylinder; a shock strut piston that is slidably disposed within the shock strut cylinder; a metering pin; and a percolation seal configured to restrict a flow of liquid between the shock strut cylinder and the shock strut piston.

In various embodiments, a liquid chamber is defined on a first side of the percolation seal and a mixed fluid chamber is defined on a second side of the percolation seal and the percolation seal is configured to restrict the flow of liquid from the liquid chamber to the mixed fluid chamber. In various embodiments, the liquid chamber is located within the shock strut piston and the mixed fluid chamber is located within the shock strut cylinder. In various embodiments, the metering pin is connected to the shock strut piston.

In various embodiments, the shock strut further includes an orifice plate and the metering pin extends through a metering pin aperture within the orifice plate. In various embodiments, the shock strut further includes a retainer housing and a retainer plate and the orifice plate is configured to translate along the metering pin between the retainer plate and the retainer housing.

In various embodiments, the percolation seal is configured to contact the retainer plate when the percolation seal is in an inflated state. In various embodiments, the metering pin includes a channel and the percolation seal is configured to reside within the channel when the percolation seal is in a deflated state. In various embodiments, the channel is positioned proximate the retainer plate when the shock strut is in an extended position. In various embodiments, the percolation seal is an annular seal configured to contact an annular wall of the retainer plate when the percolation seal is in the inflated state.

A landing gear system is disclosed. In various embodiments, the landing gear system includes a shock strut cylinder; a shock strut piston that is slidably disposed within the shock strut cylinder; a metering pin; a percolation seal configured to restrict a flow of liquid between the shock strut cylinder and the shock strut piston; and a fluid source coupled to the percolation seal, the fluid source configured to pressurize a fluid in order to inflate the percolation seal.

In various embodiments, the fluid source is further configured to depressurize the fluid in order to deflate the percolation seal. In various embodiments, the fluid source is fluidly coupled to the percolation seal via a conduit that extends through the metering pin. In various embodiments, the fluid source is located external of the shock strut cylinder and the shock strut piston or internal to at least one of the shock strut cylinder or the shock strut piston. In various embodiments, a first sensor is configured to sense one or more of a weight on wheel value, a torque link position value, a drag brace position value or a retract actuator position value. In various embodiments, a second sensor is configured to sense whether the percolation seal is in an inflated state or a deflated state.

A method for restricting percolation within a landing gear assembly via a percolation seal is disclosed. In various embodiments, the method includes sensing whether the landing gear assembly is being retracted or extended; inflating the percolation seal if the landing gear assembly is being retracted; and deflating the percolation seal if the landing gear assembly is being extended. In various embodiments, the method further includes sensing whether the percolation seal is in an inflated state or a deflated state. In various embodiments, the inflating the percolation seal comprises pressurizing a fluid in communication with the percolation seal. In various embodiments, the deflating the percolation seal comprises depressurizing the fluid in communication with the percolation seal.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

FIGS. 2A and 2B illustrate various mechanical components of a shock strut of a landing gear assembly, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
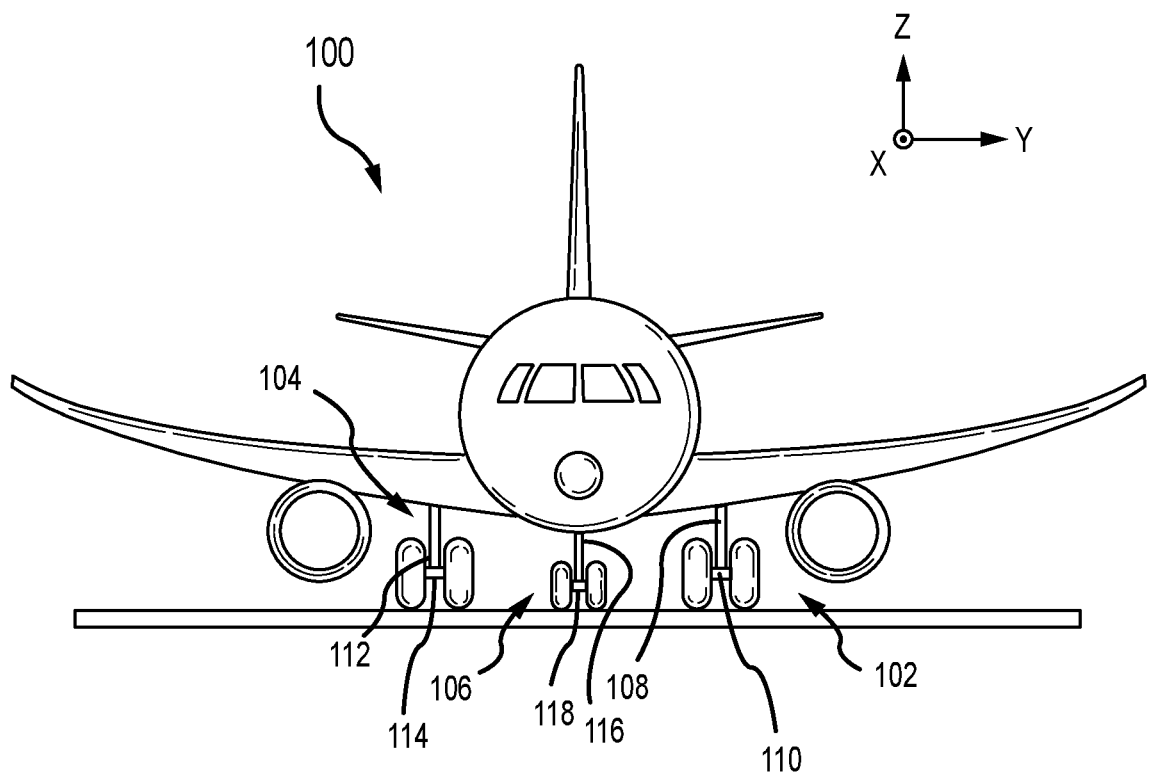
FIG. 1 illustrates an aircraft having left, right and nose landing gear assemblies and wheels mounted thereon, in accordance with various embodiments.

With reference to FIG. 1, an aircraft 100 is illustrated. In accordance with various embodiments, the aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of the left landing gear assembly 102, the right landing gear assembly 104 and the nose landing gear assembly 106 may support the aircraft 100 when not flying, allowing the aircraft 100 to taxi, takeoff and land, safely and without damage to the aircraft. In various embodiments, the left landing gear assembly 102 may include a left shock strut assembly 108 and a left wheel assembly 110, the right landing gear assembly 104 may include a right shock strut assembly 112 and a right wheel assembly 114 and the nose landing gear assembly 106 may include a nose shock strut assembly 116 and a nose wheel assembly 118.

Referring now to FIGS. 2A and 2B, a landing gear assembly 200, similar to the landing gear assemblies described above with reference to FIG. 1, is illustrated. In accordance with various embodiments, the landing gear assembly 200 includes a shock strut 202, which itself may include a shock strut cylinder 204 and a shock strut piston 206. The shock strut piston 206 is operatively coupled to slide or telescope within the shock strut cylinder 204. The shock strut piston 206 may comprise a first end 208 disposed within the shock strut cylinder 204 and a second end 210 extending from shock strut cylinder 204. The shock strut cylinder 204 may be configured to receive the shock strut piston 206 in a manner that allows the two components to telescope together and absorb and dampen forces transmitted thereto. FIG. 2A illustrates the shock strut 202 in an extended position. When in a compressed position, the shock strut piston 206 will have translated or slid a distance into the shock strut cylinder 204 from that illustrated in FIG. 2A.

In various embodiments, a liquid, such as, for example, hydraulic fluid or oil is located within a liquid chamber 212. Further, a gas, such as nitrogen or air, is located within a mixed fluid chamber 214. In various embodiments, the shock strut cylinder 204 and the shock strut piston 206 are configured to seal (e.g., via a seal ring 216) such that the liquid contained within the liquid chamber 212 is prevented from leaking into the mixed fluid chamber 214 as the shock strut piston 206 translates relative to the shock strut cylinder 204. In various embodiments, the shock strut 202 includes an orifice plate 218 configured to separate the liquid chamber 212 (also referred to herein as a first chamber or a dynamic liquid chamber) from the mixed fluid chamber 214 (also referred to herein as a second chamber or a mixed gas/liquid chamber). In this regard, during operation, the liquid, such as, for example, hydraulic fluid or oil, may be located within the liquid chamber 212 (or the first or dynamic liquid chamber) and a mixture of a gas, such as, for example, nitrogen or air, and the liquid may be located within the mixed fluid chamber 214 (or the second or mixed gas/liquid chamber).

Still referring to FIGS. 2A and 2B, the shock strut 202 includes a metering pin 220 coupled to the shock strut piston 206 and configured to translate with the shock strut piston 206. In various embodiments, the metering pin 220 is received by and extends through the orifice plate 218. The orifice plate 218 may comprise a metering pin aperture 222 configured to receive the metering pin 220. In various embodiments, the metering pin 220 includes a metering flute (or a plurality of metering flutes) disposed along the length (along the Z-direction) of the metering pin 220. As described herein, the metering flute defines a flow channel between the metering pin 220 and the metering pin aperture 222 of the orifice plate 218 through which liquid may travel from the liquid chamber 212 to the mixed fluid chamber 214 in response to shock strut 202 moving to a compressed position from an extended position. In various embodiments, the orifice plate 218 is housed within a retainer housing 224 and a retainer plate 226, both of which are typically annular in shape and secured to a support tube 228. The retainer housing 224 and the retainer plate 226 are configured to allow the orifice plate 218 to abut against the retainer plate 226, thereby restricting (but not preventing) the flow of liquid from the liquid chamber 212 into the mixed fluid chamber 214 during compression of the shock strut 202. Conversely, the orifice plate 218 translates away from the retainer plate 226 during extension of the shock strut 202 or when the shock strut 202 is retracted into a landing gear bay, thereby reducing the restriction and allowing the liquid in the mixed fluid chamber 214 to flow back into the liquid chamber 212. As described in more detail below, the landing gear assembly further includes a percolation seal 250 configured to restrict the flow (or percolation) of liquid from the from the liquid chamber 212 into the mixed fluid chamber 214 while the shock strut 202 is retracted into the landing gear bay of an aircraft. In various embodiments, the percolation seal 250 is operatively coupled to a fluid source 260 that may be housed within the aircraft and connected to the percolation seal 250 via a conduit 262 that may run through the metering pin 220. In various embodiments, a fluid source 261 may, alternatively, be housed internal to or within the shock strut 202, rather than being housed within the aircraft, and connected to the percolation seal 250 via a conduit 263 that may run through the metering pin 220.

Figure 3A:
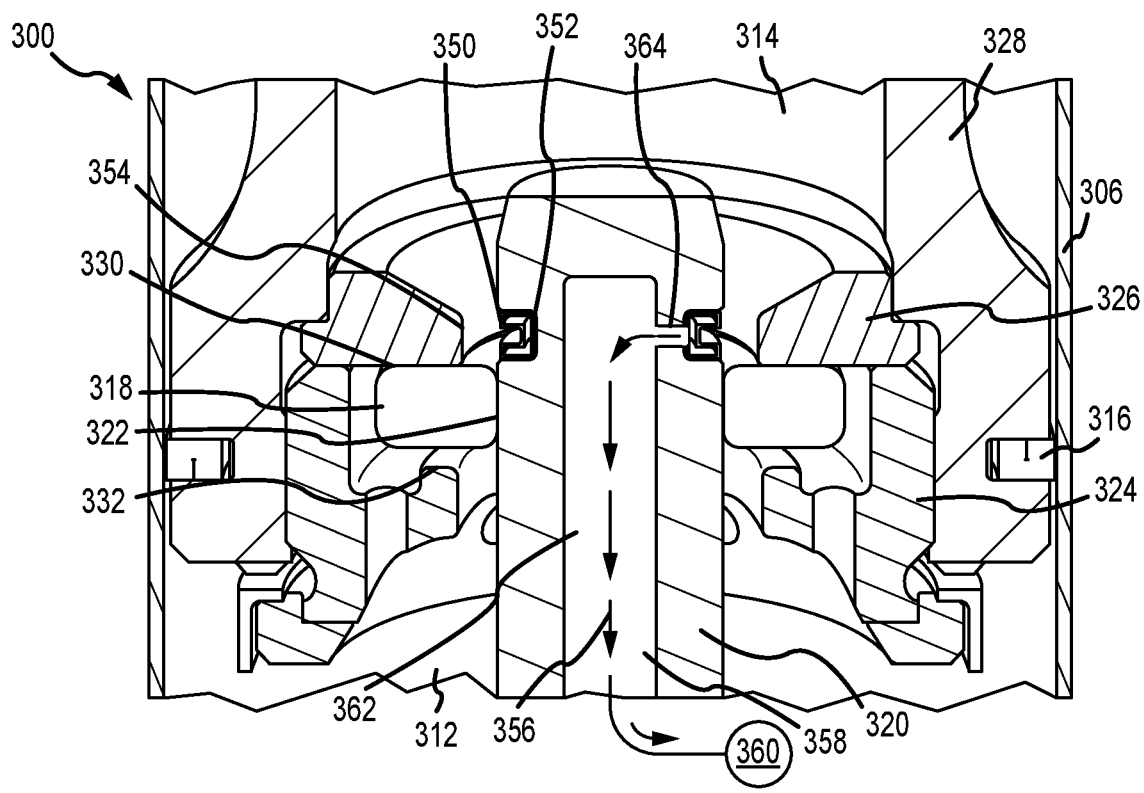
FIGS. 3A and 3B illustrate various mechanical components of a shock strut of a landing gear assembly, in accordance with various embodiments.
Figure 3B:
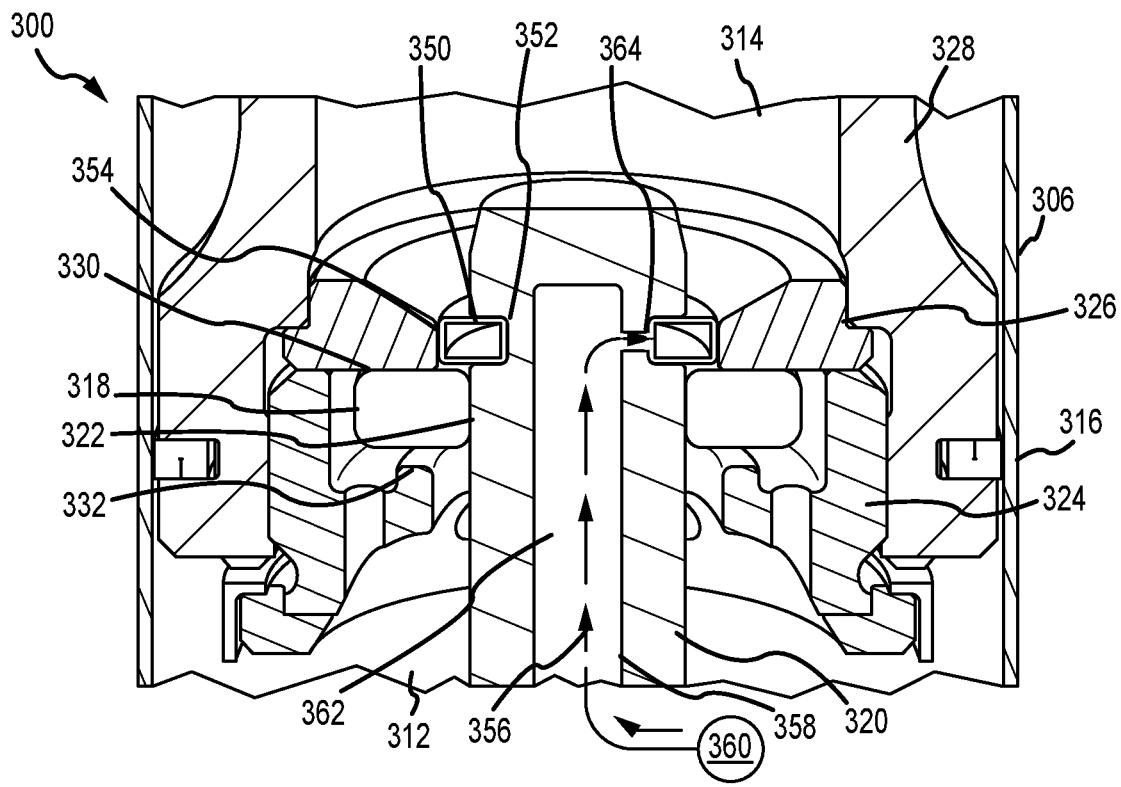

Referring now to FIGS. 3A and 3B, an exploded view of a portion of a landing gear assembly 300, similar to the landing gear assembly 200 described above with reference to FIGS. 2A and 2B, is illustrated. In accordance with various embodiments, the landing gear assembly 300 includes the same or similar components described above, including a shock strut piston 306 configured to slide or telescope within a shock strut cylinder (e.g., the shock strut cylinder 204), a support tube 328 and a retainer housing 324 and a retainer plate 326, both of which are secured to the support tube 328. The landing gear assembly 300 further includes an orifice plate 318 housed within the retainer housing 324 and the retainer plate 326. As described above, the orifice plate 318 is configured to translate along a metering pin 320 that extends through a metering pin aperture 322 bored through the orifice plate 318. The orifice plate 318 is configured to translate between a lower surface 330 of the retainer plate 326 and an upper surface 332 of the retainer housing 324, with the orifice plate abutting the lower surface of the retainer plate 326 during compression and abutting the upper surface 332 of the retainer housing 324 during extension. A seal ring 316 is configured to prevent a liquid (e.g., hydraulic fluid or oil) contained within a liquid chamber 312 is prevented from leaking into a mixed fluid chamber 314 containing a gas (e.g., nitrogen or air) as the shock strut piston 306 translates relative to the shock strut cylinder.

Still referring to FIGS. 3A and 3B, the landing gear assembly 300 further includes a percolation seal 350 (e.g., an annular seal) configured to restrict liquid from flowing (or percolating) from the liquid chamber 312 and into the mixed fluid chamber 314 while the landing gear assembly 300 is retracted into a landing gear bay of an aircraft and positioned such that some or all of the liquid within the liquid chamber 312 is at a height above the mixed fluid chamber 314 and thereby subject to percolate or flow into the mixed fluid chamber 314 under the influence of gravity. In various embodiments, the percolation seal 350 is disposed within a channel 352 cut into the metering pin 320. In various embodiments, the location of the channel 352 is selected such that the percolation seal 350 is positioned adjacent an annular wall 354 of the retainer plate 326 when the landing gear assembly is positioned for retraction within the landing gear bay, which is typically at or near the fully extended position.

As illustrated in FIGS. 3A and 3B, the percolation seal 350 may, in various embodiments, be inflated (see FIG. 3B) or deflated (see FIG. 3A), respectively, by pressurizing or depressurizing a fluid 356 (e.g., an oil or a gas) in fluid communication with the percolation seal 350. In various embodiments, the percolation seal 350 is operatively coupled to a fluid source 360 that may be housed within the aircraft and connected to the percolation seal 350 via a conduit 362 that may run through the metering pin 320 or a portion thereof; as noted above, in various embodiments, the fluid source 360 may, alternatively, be housed internal to or within the shock strut 302, rather than being housed within the aircraft. The fluid source 360 is configured to pressurize the fluid 356 in order to inflate the percolation seal 350 and to depressurize the fluid 356 in order to deflate the percolation seal 350. A seal orifice 364 may extend through a wall of the metering pin 320, thereby fluidly coupling the fluid 356 within the conduit 362 (as well as the fluid source 360) and the percolation seal 350. When inflated (see FIG. 3B), the percolation seal 350 contacts the annular wall 354 of the retainer plate 326, thereby sealing the liquid chamber 313 from the mixed fluid chamber 314 and thereby restricting the flow of liquid from the liquid chamber 312 into the mixed fluid chamber 314. In various embodiments, the fluid source 360 may include a pressure sensor configured to sense the pressure of the fluid 356 in order to determine whether the percolation seal 350 is an inflated state or a deflated state.

Figure 4:
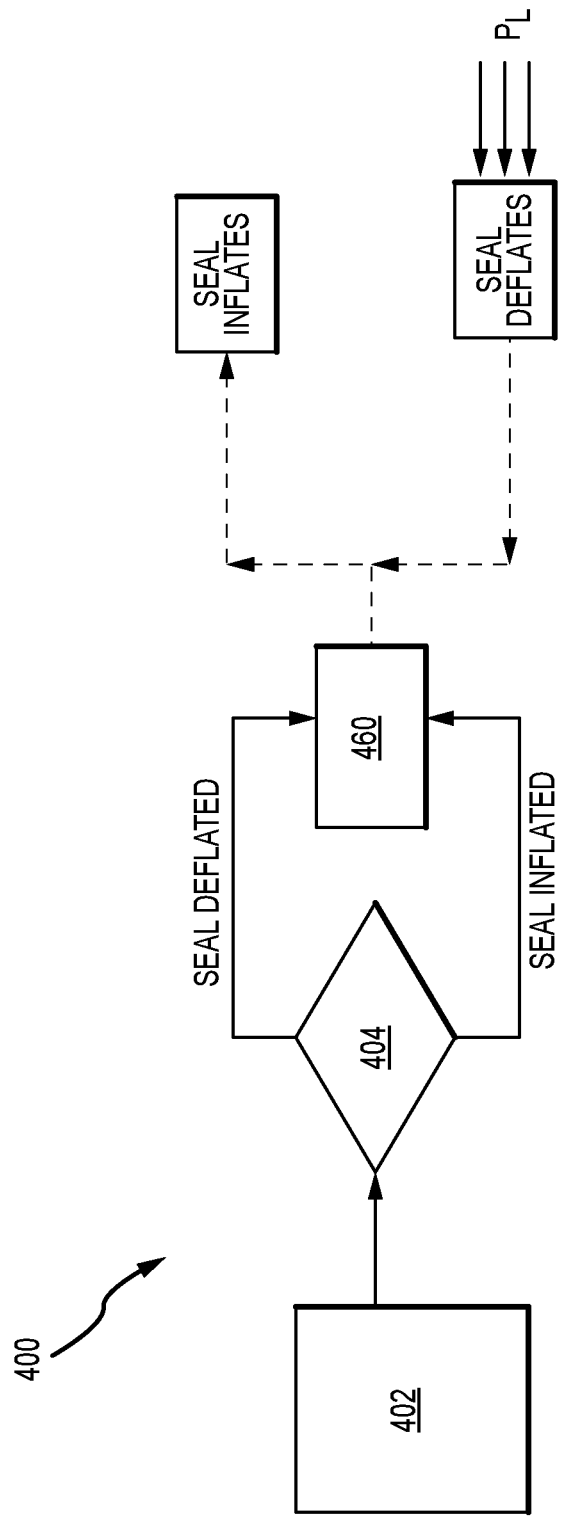
FIG. 4 illustrates a system for operating a percolation seal within a shock strut of a landing gear assembly, in accordance with various embodiments.

Referring now to FIG. 4, a system 400 (or a landing gear system) for operating a percolation seal within a landing gear assembly is described, in accordance with various embodiments. The system 400 includes a sensor 402 (or a first sensor) configured to provide input signals to a controller 404. In various embodiments, the sensor 402 is configured to sense one or more of a weight on wheel (WOW) value, a torque link position value, a drag brace position value or a retract actuator position value. Ultimately, the sensed values are transmitted to the controller 404 to indicate a landing gear assembly having a percolation seal (e.g., the landing gear assembly 300 and percolation seal 350 described above with reference to FIGS. 3A and 3B) is being retracted or extended. The controller 404 then determines (e.g., via an input from a pressure sensor (or a second sensor) coupled to a fluid used to inflate or deflate the percolation seal) whether the percolation seal is in an inflated state or a deflated state. If the percolation seal is in the deflated state (e.g., during retraction following takeoff), then the controller 404 instructs a fluid source 460 (e.g., the fluid source 360 described above) to inflate the percolation seal. If the percolation seal is in the inflated state (e.g., during approach prior to landing), then the controller 404 instructs the fluid source 460 to relieve the pressure on the fluid seal, thereby deflating the percolation seal. In various embodiments, delating the percolation seal may occur via the fluid source 460 reducing the pressure against the percolation seal to a nominal value, thereby allowing the pressure $P_L$ of the liquid within the liquid chamber (e.g., the liquid chamber 312 described above) to automatically deflate the percolation seal upon landing or the fluid source 460 may applying a suction to the percolation seal, thereby manually deflating the percolation seal prior to landing. In various embodiments, the controller 404 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof.

Figure 5:
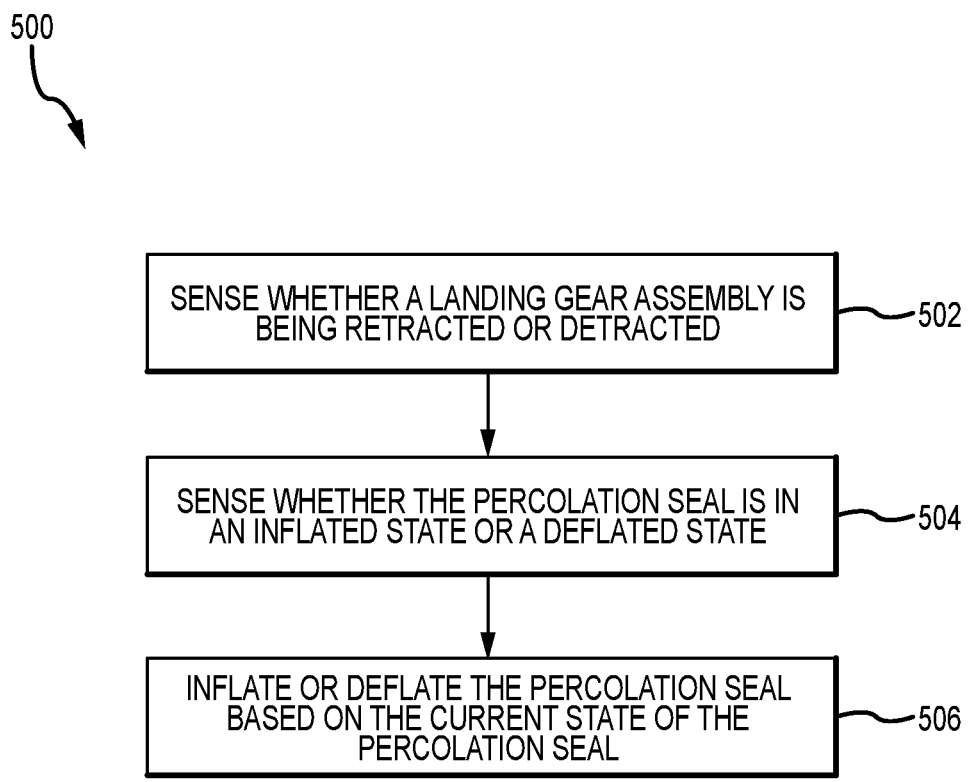
FIG. 5 describes a method for restricting percolation within a shock strut of landing gear assembly, in accordance with various embodiments

Referring now to FIG. 5, a method 500 for restricting percolation within a landing gear assembly is described, in accordance with various embodiments. A first step 502 includes sensing whether a landing gear assembly is being retracted or extended. In various embodiments, the sensing is accomplished via a first sensor configured to sense one or more of a weight on wheel (WOW) value, a torque link position value, a drag brace position value or a retract actuator position value. A second step 504 includes sensing whether the percolation seal is in an inflated state or a deflated state. In various embodiments, the sensing is accomplished via a second sensor coupled to a fluid used to inflate or deflate the percolation seal. A third step 506 includes either inflating or deflating the percolation seal based on the current state of the percolation seal. In various embodiments, inflation of the percolation seal is accomplished by pressurizing a fluid in communication with the percolation seal and deflation of the percolation seal is accomplished by depressurizing the fluid.

The foregoing apparatus, systems and methods provide a manner of controlling, restricting or otherwise preventing percolation within a shock strut of a landing gear assembly. Restricting or preventing percolation results in faster preparation of a landing gear assembly for a landing operation, where, without such restriction or prevention, percolation of liquid (e.g., oil) from a liquid chamber into an adjacent mixed fluid chamber may increase the time required between extension of the landing gear and carrying out the landing operation, the increase in the time required being due to the time required for reverse percolation to occur. Stated otherwise, the foregoing apparatus, systems and methods improve performance of a shock strut, as sufficient oil is maintained within the liquid chamber (or the lower chamber) during the time the landing gear is retracted, thereby allowing the landing gear to remain in an operationally ready state for landing within a prescribed or desired time period following extension. Further, in order to maintain the oil within the liquid chamber, where retraction of the landing gear is typically commanded to occur on the order of three to five seconds following liftoff (or following a weight off wheels status), the foregoing apparatus, systems and methods facilitate immediate inflation of the percolation seal upon liftoff and well within the approximately three to five second window within which the landing gear is commanded to commence retraction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A shock strut, comprising:
   a shock strut cylinder;
   a shock strut piston that is slidably disposed within the shock strut cylinder;
   a metering pin coupled to the shock strut piston;
   a conduit disposed through the metering pin;
   a seal orifice extending through a wall of the metering pin and in fluid communication with the conduit;
   a fluid source coupled to the conduit and in fluid communication with the conduit, the metering pin, and the seal orifice; and
   an annular seal in fluid communication with the fluid source through the conduit, the metering pin, and the seal orifice, the annular seal configured to inflate and deflate, the annular seal restricting a flow of liquid between the shock strut cylinder and the shock strut piston when the annular seal is in an inflated state, wherein the fluid is configured to flow through the conduit, completely through the metering pin via the seal orifice, and into the annular seal.

2. The shock strut of claim 1, wherein a liquid chamber is defined on a first side of the annular seal and a mixed fluid chamber is defined on a second side of the annular seal and the annular seal is configured to restrict the flow of liquid from the liquid chamber to the mixed fluid chamber.

3. The shock strut of claim 2, wherein the liquid chamber is located within the shock strut piston and the mixed fluid chamber is located within the shock strut cylinder.

4. The shock strut of claim 3, wherein the metering pin is connected to the shock strut piston.

5. The shock strut of claim 1, further comprising an orifice plate and wherein the metering pin extends through a metering pin aperture within the orifice plate.

6. The shock strut of claim 5, further comprising a retainer housing and a retainer plate and wherein the orifice plate is configured to translate along the metering pin between the retainer plate and the retainer housing, wherein the annular seal is disposed between the retainer plate and the metering pin.

7. The shock strut of claim 6, wherein the annular seal is configured to contact the retainer plate when the annular seal is in the inflated state.

8. The shock strut of claim 7, wherein the metering pin includes a channel and the annular seal is configured to reside within the channel when the annular seal is in a deflated state.

9. The shock strut of claim 8, wherein the channel is positioned proximate the retainer plate when the shock strut is in an extended position.

10. The shock strut of claim 9, wherein the annular seal is configured to contact an annular wall of the retainer plate when the annular seal is in the inflated state.

11. A landing gear system, comprising:
    a shock strut cylinder;
    a shock strut piston that is slidably disposed within the shock strut cylinder;
    a metering pin;
    a conduit disposed through the metering pin;
    a seal orifice extending through a wall of the metering pin and in fluid communication with the conduit;
    an annular seal in fluid communication with the seal orifice, the annular seal configured to inflate and deflate, the annular seal restricting a flow of liquid between the shock strut cylinder and the shock strut piston when the annular seal is in an inflated state; and
    a fluid source in fluid communication with the conduit, the seal orifice, and the annular seal, the fluid source configured to pressurize a fluid causing the fluid to flow through the conduit, the seal orifice, and into the annular seal in order to inflate the annular seal to the inflated state.

12. The landing gear system of claim 11, wherein the fluid source is further configured to depressurize the fluid in order to deflate the annular seal.

13. The landing gear system of claim 12, wherein the fluid source is located external of the shock strut cylinder and the shock strut piston or internal to at least one of the shock strut cylinder or the shock strut piston.

14. The landing gear system of claim 13, further comprising a first sensor configured to sense one or more of a weight on wheel value, a torque link position value, a drag brace position value or a retract actuator position value.

15. The landing gear system of claim 14, further comprising a second sensor configured to sense whether the annular seal is in the inflated state or a deflated state.

16. A method for restricting fluid flow within a landing gear assembly via an annular seal, comprising:
    sensing whether the landing gear assembly is being retracted or extended, wherein the landing gear assembly includes a conduit extending through a metering pin and a fluid source in fluid communication with the conduit;
    inflating the annular seal if the landing gear assembly is being retracted to seal a liquid chamber from a mixed fluid chamber, wherein inflating the annular seal includes pressurizing a fluid in the conduit by the fluid source, the fluid being configured to flow through the conduit, through the metering pin via a seal orifice, and into the annular seal, wherein a retainer plate separates the liquid chamber and the mixed fluid chamber, the annular seal disposed adjacent the retainer plate when the landing gear assembly is being retracted; and
    deflating the annular seal if the landing gear assembly is being extended, wherein the fluid is configured to flow out of the annular seal, through the conduit, and into the fluid source in response to a decrease in pressure.

17. The method of claim 16, further comprising sensing whether the annular seal is in an inflated state or a deflated state.

18. The method of claim 16, wherein the inflating the annular seal comprises pressurizing a fluid in communication with the annular seal.

19. The method of claim 18, wherein the deflating the annular seal comprises depressurizing the fluid in communication with the annular seal.

* * * * *